Nov. 10, 1942.   R. G. PLUMLEY   2,301,792
SLIDER FOR SLIDE FASTENERS
Filed Aug. 12, 1941   3 Sheets-Sheet 1
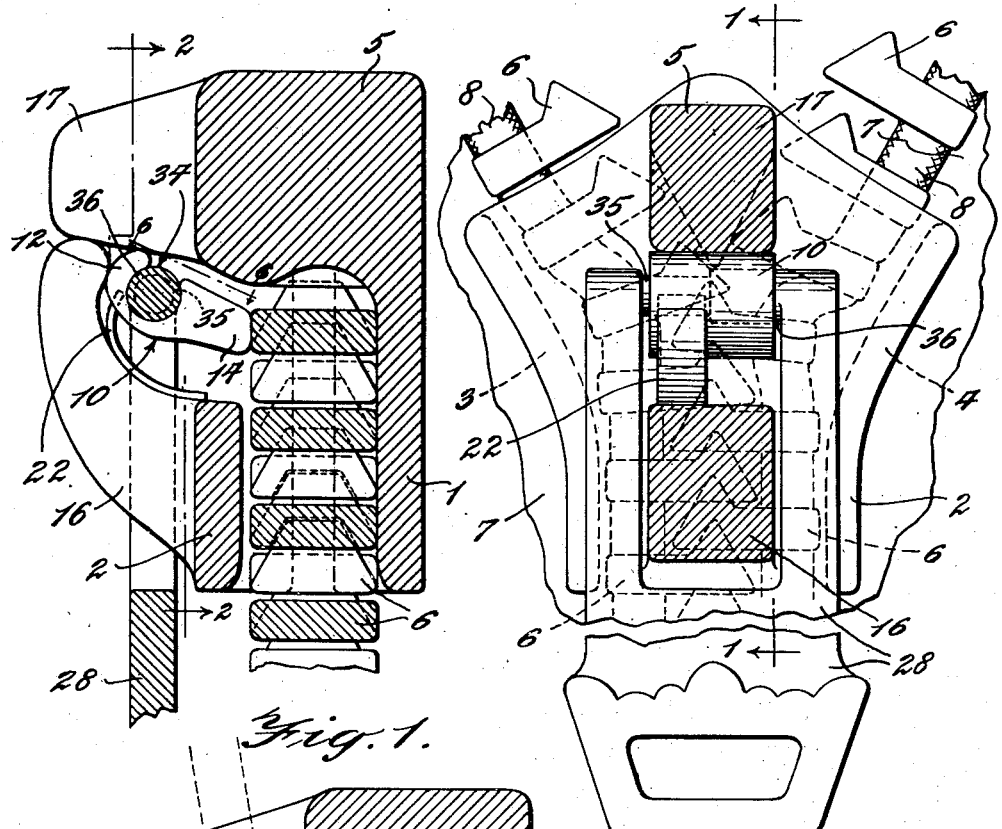
Fig. 1.
Fig. 2.
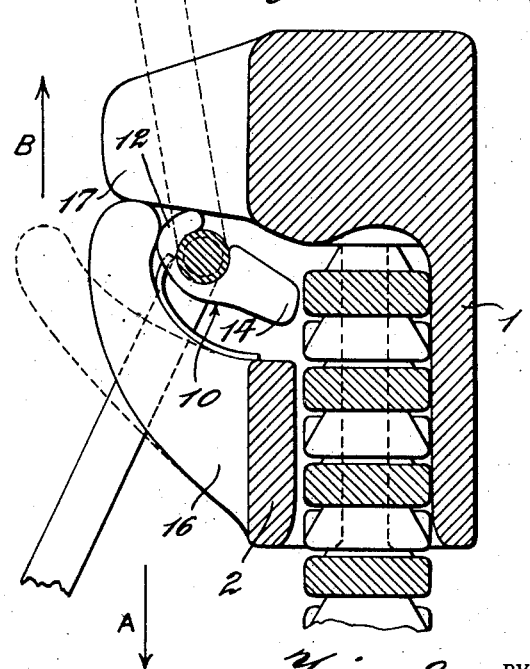
Fig. 3.
INVENTOR.
Richard G. Plumley
BY Gifford, Scull & Burgess
ATTORNEYS Nov. 10, 1942.    R. G. PLUMLEY    2,301,792
SLIDER FOR SLIDE FASTENERS
Filed Aug. 12, 1941    3 Sheets-Sheet 2

INVENTOR.
Richard G. Plumley
BY Gifford, Scull & Burgess
ATTORNEYS

Nov. 10, 1942.   R. G. PLUMLEY   2,301,792
SLIDER FOR SLIDE FASTENERS
Filed Aug. 12, 1941   3 Sheets-Sheet 3
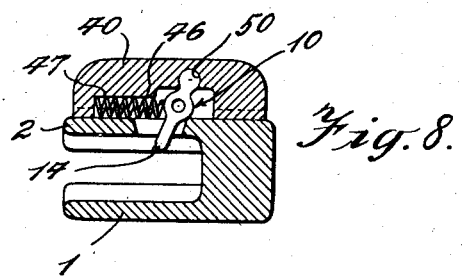
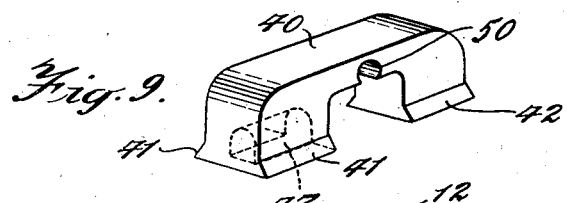
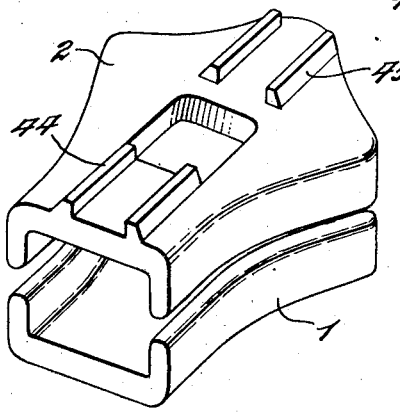
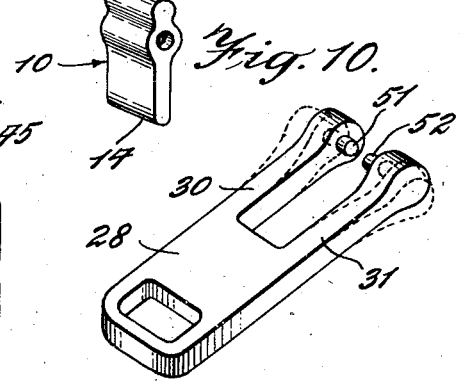
INVENTOR.
Richard G. Plumley
BY Gifford, Scull & Burgess
ATTORNEYS Patented Nov. 10, 1942

2,301,792

UNITED STATES PATENT OFFICE 2,301,792

SLIDER FOR SLIDE FASTENERS

Richard G. Plumley, Glenbrook, Conn., assignor to Crown Fastener Corporation, Warren, R. I., a corporation of Delaware Application August 12, 1941, Serial No. 406,460

5 Claims. (Cl. 24—205.5)

This invention relates to slide fasteners, more especially slides (for said fasteners) having channels for the passage therethrough of the links or scoops of the fasteners.

It is desirable to construct such sliders so that they will releasably engage or lock the links or scoops in any desired position. The functions of locking and satisfactorily sliding over the links or scoops are at least to some extent antithetical and consequently much labor and thought have been devoted to devising slide structure which will satisfactorily combine these functions.

The principal object of the present invention is to provide improved slide structure for this purpose.

The invention will be defined in the claims and illustratively described as follows, reference being made to the accompanying drawings, in which:

Fig. 1 is a section of the improved slide structure taken on the line 1—1 of Fig. 2, showing the locking element or pawl in locking engagement with the links or scoops;

Fig. 2 is a section taken on the line 2—2 of Fig. 1;

Fig. 3 is a section similar to Fig. 1 showing the pawl disengaged from the links by the action of the pull tab;

Figure 4:
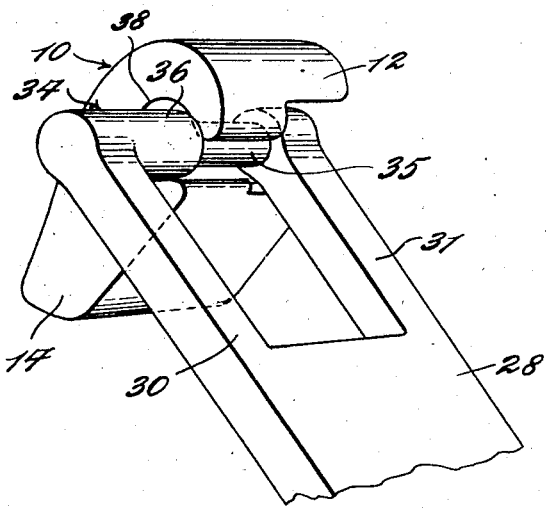
Figure 6:
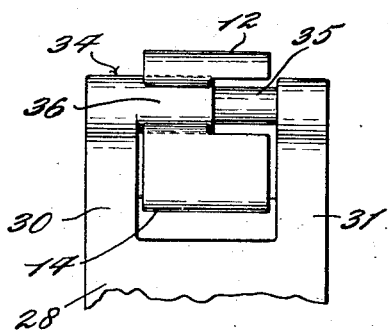
Figure 5:
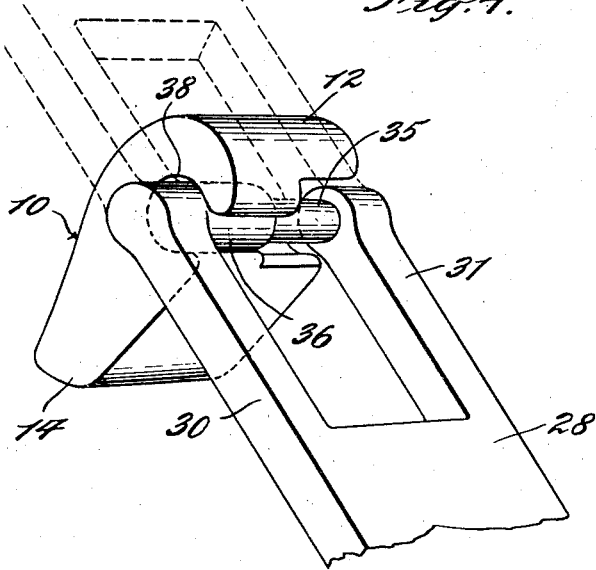

Figs. 4 to 7, inclusive, are fragmentary views showing steps in the assembly of the structure shown in Figs. 1 to 3, Fig. 6 being a view looking in the direction of the line 6—6 of Fig. 1.

Fig. 8 is a longitudinal sectional view of a modified form of invention.

Fig. 9 is a perspective view of the bracket shown in Fig. 8.

Fig. 10 is a perspective view of the pawl of Fig. 8.

Fig. 11 is a perspective view of the slide structure of Fig. 8.

Fig. 12 is an isometric view of the pull of Fig. 8.

Referring more specifically to Figs. 1 to 3, the invention employs certain conventional slide structure including a slide body having top and bottom wings 1, 2, flared side walls 3, 4, and a frog or web 5 connecting the wings, these several elements partly defining channels for the passage therethrough of links or scoops 6 mounted on tapes 7 having beaded edges 8, the tapes passing through slots in the side walls in a conventional manner.

In accordance with the invention a pawl 10 is provided having a pivot end 12 and a link-engaging end 14 and is pivoted, at its pivot end, for swinging movement into and out of engagement with the links 6. Means are provided to support the pawl for the operation thereof, which means are illustrated in Figs. 1 to 3 as members 16, 17 (carried by the upper wing) constituting a bracket or housing integral with the slide body. Preferably the pawl 10 is supported as shown with the longitudinal axis thereof inclined in relation to the axes of the channels. In the form illustrated in Figs. 1 to 3 the pivotal mounting of the pawl is of the floating type since the pivot end of the pawl merely engages the members 16, 17 as shown, whereas in the form illustrated in Figs. 8 to 12 the pivot end of the pawl is journalled in a bearing 50 within the bracket 40. Means are also provided which normally resiliently urge the link-engaging end of the pawl into engagement with the links. In the form illustrated in Figs. 1 to 3 and 7 this means is embodied in a leaf spring 22 carried by the member 16. In the form illustrated in Fig. 8 this means is embodied in a coiled spring 46 housed within the recess 47 in the bracket 40.

Figure 7:
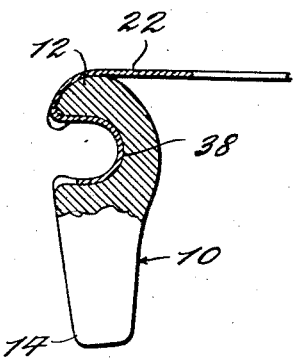

Intermediate between the pivot end and the link-engaging end of the pawl and preferably nearer the pivot end than the link-engaging end, a pull tab 28 is pivotally mounted on the pawl in the manner hereinafter more fully described. Referring more particularly to Figs. 4 to 7 inclusive, the pull tab is bifurcated and has a pair of legs 30, 31 joined at the ends thereof by a transverse bar 34 a portion of which 35 has a reduced diameter. The pawl has a bearing 38 intermediate the ends thereof and nearer the pivot end than the link-engaging end. Portions of the wall of the bearing are cut away to permit entry of the portion 35 of the bar having reduced diameter and the end of the leg 31, so that the pull tab and pawl may be assembled with the portion 36 of the bar having a larger diameter riding in the bearing 38 of the pawl as shown in detail in Fig. 6. As shown in Fig. 7, the leaf spring 22 may be bent around and engaged with the surface of the bearing and within the space provided between that surface and the portion 35 of the bar having the smaller diameter.

Assembly of the structure illustrated in Figs. 1 to 7 occurs as follows: The member 16, prior to final assembly, is in the position shown in dotted lines in Fig. 3. The pull tab and pawl are assembled as illustrated in connection with Figs. 4 to 6. The member 16 shown in dotted lines in Fig. 3 is inserted in the space between the legs 30, 31 of the pull tab and the member 16 is then swaged down into the position shown in full lines in Figs. 1 to 3, the dimensions of these various members being such that there is just enough clearance, as shown in Fig. 2, between the member 16 and the legs of the pull tab 28 to permit the latter to properly pivot. In this position the bar of the pull tab is pivotally secured in the pawl.

Figs. 8 to 12 illustrate a somewhat different structure and method of assembly of the parts thereof. As shown in Fig. 9, the bracket 40 has shoe portions 41, 42 which may be bevelled, as shown, for engagement with and between the rails 44, 45 on the wing 2, after which these rails may be swaged into contact with the shoes 41, 42 to secure the bracket 40 on the slide body. The method of assembly of the parts shown in Figs. 8 to 12 is as follows: The spring 46 is inserted in the recess 47 in the bracket. The pivot end 12 of the pawl 10 is then journalled in the bearing 50 in the bracket 40. The legs 30, 31 of the pull tab 28 are then spread apart a sufficient distance, as shown in dotted lines in Fig. 12, to permit the pins 51, 52 to straddle the bracket and pawl whereupon the legs are then bent together to the position shown in full lines in Fig. 12, to cause the pull tab to be pivotally mounted on the pawl by means of said pins. The bracket, pawl and pull tab are then mounted on the slide by engaging the shoes 41, 42 with and between the rails 44 on the wing 2.

It will be noted that in all cases the pull tab is pivotally mounted on the pawl so that the axis of this pivotal mounting is intermediate the pivot end of the pawl and the link-engaging end. In the operation of the device the spring of Figs. 1 to 3 and 7 or the spring shown in Fig. 8, normally urges and swings the pawl into locking engagement with the links or scoops to an extent sufficient to prevent undesired movement of the slide in relation to the links. If it is desired to move the slide in the direction shown by the arrow marked "A" in Fig. 3, the pull tab is moved into some such position as that shown in full lines in Fig. 3 whereupon tension on the pull tab swings the pawl out of engagement with the links so that the slide may be freely moved in the stated direction. If it is desired to move the slide in the direction of the arrow marked "B" in Fig. 3, the pull tab is moved into the position shown in dotted lines in that figure and tension on the pull tab then also permits movement of the slide in the stated direction. Such tension causes engagement of the links with the link-engaging end of the pawl.

However, the effectiveness of the force tending to produce frictional engagement of the link-engaging end of the pawl with the links and applied to the pull is diminished below the effectiveness of the force applied to the same end of the pawl by the links and tending to cause disengagement of the links and pawl, in proportion to the ratio of the short and long lever arms established by the mounting of the pull intermediate the ends of the pawl. The short lever arm has a length equal to the distance from the pivot end 12 of the pawl to the axis of the pivotal mounting of the pull on the pawl and the long lever arm has a length equal to the distance between the pivot end of the pawl and the link engaging end thereof. The smaller this ratio, the greater is the leverage effect and the greater is the ease with which the pawl rides over the links in the direction of the arrow in Fig. 3. Consequently, in movement of the slide in the direction shown by the arrow marked "B" in Fig. 3 the pawl is released from its normal locking engagement with the links and slides or rides over the links. Upon meeting any obstruction due to an uneven surface, the pawl will swing about its pivot and ride up over the obstruction. Upon release of tension on the pull tab the pawl then assumes its normal link-engaging position. The operation of the modification shown in Figs. 8 to 12 is, of course, the same in principle as that described in connection with Figs. 1 to 3 and need not be repeated.

I claim:

1. In a slider for separable fasteners of the type described, having channels for the passage therethrough of links; a link-engaging pawl having a link-engaging end and a pivot end; means to support said pawl in operative relation to said links; said pawl being pivoted at its pivot end on said support means; means normally and resiliently urging the link-engaging end of the pawl into engagement with said links and a pull tab pivotally mounted only on said pawl intermediate the ends thereof and nearer to the pivot end of the pawl than to the link-engaging end.

2. In a slider for separable fasteners of the type described, having channels for the passage therethrough of links; a link-engaging pawl having a link-engaging end and a pivot end; means to support said pawl in operative relation to said links with the longitudinal axis of the pawl inclined in relation to the axes of said channels; said pawl being pivoted, on said support means, at its pivot end, for swinging movement into and out of engagement with said links; spring means normally swinging the pawl into engagement with said links and a pull tab pivotally mounted only on said pawl intermediate the ends thereof and nearer to the pivot end of the pawl than to the link-engaging end.

3. In a slider for separable fasteners of the type described, having top and bottom wings partly defining channels for the passage therethrough of links; a link-engaging pawl having a link-engaging end and a pivot end; a bracket carried by one of said wings, said pawl being pivoted, on said bracket, at its pivot end, for swinging movement into and out of engagement with said links; spring means in contact with said bracket and normally swinging the pawl about its pivot into engagement with said links, and a bifurcated pull tab having a pair of legs which straddle the bracket for swinging movement in relation thereto and are pivotally joined only to the pawl intermediate the ends thereof and nearer to the pivot end of the pawl than to the link-engaging end thereof.

4. In a slider for separable fasteners of the type described, having channels for the passage therethrough of links; a link-engaging pawl having a link-engaging end and a pivot end; means to support said pawl in operative relation to said links; said pawl being pivoted at its pivot end on said support means; means normally and resiliently urging the link-engaging end of the pawl into engagement with said links and a pull tab pivotally mounted only on said pawl intermediate the ends thereof.

5. In a slider for separable fasteners of the type described, having channels for the passage therethrough of links; a link-engaging pawl having a link-engaging end and a pivot end; a pull tab having a finger grip end and a pawl-engaging end; means to support the pawl; said pawl pivotally engaging the support means independently of the pull, at the pivot end of the pawl, for swinging movement into and out of engagement with said links; spring means normally swinging the pawl into engagement with the links; the pull tab being pivotally joined, at the pawl-engaging end thereof, to the pawl, intermediate the ends thereof and nearer the pivot end of the pawl than the link-engaging end.

RICHARD G. PLUMLEY.